US009809681B2

(12) United States Patent
Nekkanti et al.

(10) Patent No.: US 9,809,681 B2
(45) Date of Patent: Nov. 7, 2017

(54) METHOD FOR FORMING A LOW VISCOSITY POLYARYLENE SULFIDE

(71) Applicant: Ticona LLC, Florence, KY (US)

(72) Inventors: Venkata M. Nekkanti, Florence, KY (US); Hendrich A. Chiong, Cincinnati, OH (US); Jacob Grayson, Cincinnati, OH (US)

(73) Assignee: Ticona LLC, Florence, KY (US)

( * ) Notice: Subject to any disclaimer, the term of this patent is extended or adjusted under 35 U.S.C. 154(b) by 0 days.

(21) Appl. No.: 15/045,296

(22) Filed: Feb. 17, 2016

(65) Prior Publication Data

US 2016/0244567 A1 Aug. 25, 2016

Related U.S. Application Data

(60) Provisional application No. 62/117,988, filed on Feb. 19, 2015, provisional application No. 62/197,634, (Continued)

(51) Int. Cl.
| | |
|---|---|
| *C08G 75/00* | (2006.01) |
| *C08G 75/14* | (2006.01) |
| *B01D 11/02* | (2006.01) |
| *B01D 21/02* | (2006.01) |
| *C08G 85/00* | (2006.01) |

(52) U.S. Cl.
CPC .......... *C08G 75/14* (2013.01); *B01D 11/0288* (2013.01); *B01D 21/02* (2013.01); *C08G 85/002* (2013.01)

(58) Field of Classification Search
CPC .. C08G 75/025; C08G 75/14; C08G 75/0263; C08G 75/0268; C08G 75/0259; C08G 75/0281; B29B 13/00; C08F 6/008; C08F 6/28; B30B 9/28
USPC ......... 525/537; 528/387, 388, 389; 422/267, 422/186.1, 513, 422
See application file for complete search history.

(56) References Cited

U.S. PATENT DOCUMENTS

| | | | |
|---|---|---|---|
| 3,407,182 A | 10/1968 | Hinton | |
| 3,869,433 A | 3/1975 | Campbell | |

(Continued)

FOREIGN PATENT DOCUMENTS

| | | |
|---|---|---|
| EP | 1 837 359 | 9/2007 |
| JP | S5829822 | 2/1983 |

(Continued)

OTHER PUBLICATIONS

Machine translation of JP2014028917.
(Continued)

*Primary Examiner* — Shane Fang
(74) *Attorney, Agent, or Firm* — Dority & Manning, P.A.

(57) ABSTRACT

A method for washing a polyarylene sulfide with a washing solution that contains a carefully controlled solvent content is provided. More particularly, the washing solution typically contains water (e.g., deionized water) in an amount of from about 30 wt. % to about 70 wt. % and an aprotic organic solvent in an amount of from about 30 wt. % to about 70 wt. %. Within such carefully controlled ranges, the present inventors have discovered that the polyarylene sulfide can retain a relatively high oligomer content, which in turn, helps minimize the melt viscosity.

18 Claims, 2 Drawing Sheets

Related U.S. Application Data filed on Jul. 28, 2015, provisional application No. 62/206,124, filed on Aug. 17, 2015.

(56) References Cited

U.S. PATENT DOCUMENTS

| | | |
|---|---|---|
| 3,919,177 A | 11/1975 | Campbell |
| 4,038,259 A | 7/1977 | Campbell et al. |
| 4,038,260 A | 7/1977 | Campbell |
| 4,038,262 A | 7/1977 | Edmonds, Jr. |
| 4,038,263 A | 7/1977 | Edmonds, Jr. et al. |
| 4,039,518 A | 8/1977 | Campbell |
| 4,056,515 A | 11/1977 | Vidaurri, Jr. |
| 4,060,520 A | 11/1977 | Irvin |
| 4,064,114 A | 12/1977 | Edmonds, Jr. |
| 4,089,847 A | 5/1978 | Edmonds, Jr. et al. |
| 4,096,132 A | 6/1978 | Edmonds, Jr. |
| 4,368,321 A | 1/1983 | Sherk et al. |
| 4,370,470 A | 1/1983 | Vidaurri et al. |
| 4,393,197 A | 7/1983 | Edmonds, Jr. |
| 4,415,729 A | 11/1983 | Scoggins et al. |
| 4,451,640 A | 5/1984 | Shiiki et al. |
| 4,495,332 A | 1/1985 | Shiiki et al. |
| 4,500,706 A | 2/1985 | Mathis et al. |
| 4,501,902 A | 2/1985 | Cleary |
| 4,514,558 A | 4/1985 | Shiiki et al. |
| 4,535,117 A | 8/1985 | Mathis et al. |
| 4,537,953 A | 8/1985 | Kawakami et al. |
| 4,613,654 A | 9/1986 | Katto et al. |
| 4,645,826 A | 2/1987 | Iizuka et al. |
| 4,699,975 A | 10/1987 | Katto et al. |
| 4,734,484 A | 3/1988 | Alfes et al. |
| 4,740,569 A | 4/1988 | Tieszen et al. |
| 4,745,167 A | 5/1988 | Iizuka et al. |
| 4,748,231 A | 5/1988 | Nesheiwat |
| 4,767,841 A | 8/1988 | Goetz et al. |
| 4,769,442 A | 9/1988 | Iwasaki et al. |
| 4,786,711 A | 11/1988 | Senatore et al. |
| 4,794,164 A | 12/1988 | Iwasaki et al. |
| 4,795,671 A | 1/1989 | Shiiki et al. |
| 4,812,539 A | 3/1989 | Iizuka et al. |
| 4,814,430 A | 3/1989 | Iwasaki et al. |
| 4,820,800 A | 4/1989 | Geibel et al. |
| 4,820,801 A | 4/1989 | Inoue et al. |
| 4,841,019 A | 6/1989 | Iwasaki et al. |
| 4,931,516 A | 6/1990 | Iizuka et al. |
| 4,960,861 A | 10/1990 | Kotera et al. |
| 4,976,825 A | 12/1990 | Iwasaki et al. |
| 5,008,368 A | 4/1991 | Nesheiwat |
| 5,015,725 A | 5/1991 | Scoggins et al. |
| 5,023,315 A | 6/1991 | Ceurvorst et al. |
| 5,037,954 A | 8/1991 | Nesheiwat et al. |
| 5,053,486 A | 10/1991 | Nesheiwat |
| 5,071,944 A | 12/1991 | Cliffton et al. |
| 5,077,374 A | 12/1991 | Cleary |
| 5,086,163 A | 2/1992 | Scoggins et al. |
| 5,089,596 A | 2/1992 | Cliffton et al. |
| 5,089,597 A | 2/1992 | Nesheiwat et al. |
| 5,093,468 A | 3/1992 | Kohler |
| 5,110,902 A | 5/1992 | Scoggins et al. |
| 5,126,430 A | 6/1992 | Senga et al. |
| 5,128,445 A | 7/1992 | Scoggins et al. |
| 5,134,224 A | 7/1992 | Nesheiwat et al. |
| 5,145,946 A | 9/1992 | Fujii et al. |
| 5,155,207 A | 10/1992 | Senatore et al. |
| 5,179,194 A | 1/1993 | Kawakami et al. |
| 5,194,580 A | 3/1993 | Koyama et al. |
| 5,235,032 A | 8/1993 | Geibel et al. |
| 5,241,043 A | 8/1993 | Senga |
| 5,266,680 A | 11/1993 | Reed |
| 5,278,283 A | 1/1994 | Miyoshi et al. |
| 5,280,104 A | 1/1994 | Geibel et al. |
| 5,296,579 A | 3/1994 | Geibel et al. |
| 5,314,972 A | 5/1994 | Nesheiwat et al. |
| 5,328,980 A | 7/1994 | Decker et al. |
| 5,334,701 A | 8/1994 | Ash et al. |
| 5,342,920 A | 8/1994 | Imai et al. |
| 5,350,833 A | 9/1994 | Inoue et al. |
| 5,352,768 A | 10/1994 | Stuber et al. |
| 5,354,841 A | 10/1994 | Geibel et al. |
| 5,364,928 A | 11/1994 | Ash |
| 5,438,115 A | 8/1995 | Fahey et al. |
| 5,440,009 A | 8/1995 | Ash et al. |
| 5,475,081 A | 12/1995 | Imai et al. |
| 5,618,981 A | 4/1997 | Shaw |
| 5,635,587 A | 6/1997 | Koyama et al. |
| 5,688,908 A | 11/1997 | Haubs et al. |
| 5,696,282 A | 12/1997 | Shaw et al. |
| 5,744,576 A | 4/1998 | Miyahara et al. |
| 5,756,654 A | 5/1998 | Sase et al. |
| 5,777,069 A | 7/1998 | Tsuda et al. |
| 5,780,583 A | 7/1998 | Lubowitz et al. |
| 5,789,533 A | 8/1998 | Yamanaka et al. |
| 5,804,076 A | 9/1998 | Yamasaki et al. |
| 5,840,830 A | 11/1998 | Miyahara et al. |
| 5,856,433 A | 1/1999 | Koyama et al. |
| 5,894,072 A | 4/1999 | Haubs et al. |
| 5,898,061 A | 4/1999 | Sase et al. |
| 5,905,137 A | 5/1999 | Haubs et al. |
| 5,929,203 A | 7/1999 | Ash et al. |
| 6,201,097 B1 | 3/2001 | Geibel et al. |
| 6,201,098 B1 | 3/2001 | Haubs et al. |
| 6,242,501 B1 | 6/2001 | Green et al. |
| 6,281,326 B1 | 8/2001 | Ash et al. |
| 6,331,608 B1 | 12/2001 | Vidaurri et al. |
| 6,337,062 B1 | 1/2002 | Akiba |
| 6,350,852 B1 | 2/2002 | Haubs et al. |
| 6,388,003 B1 | 5/2002 | Okamoto et al. |
| 6,538,102 B1 | 3/2003 | Haubs et al. |
| 6,562,900 B2 | 5/2003 | Okamoto et al. |
| 6,566,488 B2 | 5/2003 | Okamoto et al. |
| 6,600,009 B2 | 7/2003 | Inoue et al. |
| 6,646,105 B2 | 11/2003 | Shirota |
| 6,734,282 B1 | 5/2004 | Wagener et al. |
| 6,743,890 B2 | 6/2004 | Bando |
| 6,750,319 B2 | 6/2004 | Koyama |
| 6,818,132 B2 | 11/2004 | Haubs et al. |
| 6,939,942 B2 | 9/2005 | Shirota |
| 6,982,312 B2 | 1/2006 | Senga et al. |
| 7,018,574 B2 | 3/2006 | Koyama |
| 7,026,439 B2 | 4/2006 | Senga et al. |
| 7,094,867 B2 | 8/2006 | Miyahara et al. |
| 7,115,704 B2 | 10/2006 | Horiuchi et al. |
| 7,220,817 B2 | 5/2007 | Matsuzaki et al. |
| 7,312,300 B2 | 12/2007 | Mitchell |
| 7,317,072 B2 | 1/2008 | Senga et al. |
| 7,432,339 B2 | 10/2008 | Mitchell |
| 7,501,111 B2 | 3/2009 | Keller et al. |
| 7,504,476 B2 | 3/2009 | Kawama et al. |
| 7,517,946 B2 | 4/2009 | Sato et al. |
| 7,569,656 B2 | 8/2009 | Kagoshima et al. |
| 7,632,915 B2 | 12/2009 | Sato et al. |
| 7,655,748 B2 | 2/2010 | Sato et al. |
| 7,750,111 B2 | 7/2010 | Horiuchi et al. |
| 7,754,795 B2 | 7/2010 | Hintzer et al. |
| 7,754,848 B2 | 7/2010 | Sato et al. |
| 7,767,783 B2 | 8/2010 | Kawama et al. |
| 7,834,133 B2 | 11/2010 | Suzuki et al. |
| 8,076,423 B2 | 12/2011 | Ishio et al. |
| 8,076,447 B2 | 12/2011 | Sato et al. |
| 8,138,302 B2 | 3/2012 | Sato et al. |
| 8,183,336 B2 | 5/2012 | Sato et al. |
| 8,211,997 B2 | 7/2012 | Matsuzaki et al. |
| 8,263,734 B2 | 9/2012 | Fodor et al. |
| 8,329,832 B2 | 12/2012 | Horiuchi et al. |
| 8,426,552 B2 | 4/2013 | Hinokimori et al. |
| 8,440,784 B2 | 5/2013 | Kaiho et al. |
| 8,445,629 B2 | 5/2013 | Hinokimori et al. |
| 8,530,605 B2 | 9/2013 | Konno et al. |
| 8,546,518 B2 | 10/2013 | Unohara et al. |
| 8,609,790 B2 | 12/2013 | Suzuki et al. |
| 8,680,230 B2 | 3/2014 | Konno et al. |
| 8,883,959 B2 | 11/2014 | Hinokimori |
| 8,921,513 B2 | 12/2014 | Luo et al. |
| 8,981,041 B2 | 3/2015 | Kimura et al. |

(56) References Cited

U.S. PATENT DOCUMENTS

| | | |
|---|---|---|
| 9,068,047 B2 | 6/2015 | Ichinose et al. |
| 9,074,048 B2 | 7/2015 | Kim et al. |
| 9,096,723 B2 | 8/2015 | Ichinose et al. |
| 9,187,641 B2 | 11/2015 | Ouchiyama et al. |
| 9,255,350 B2 | 2/2016 | Taniguchi et al. |
| 9,339,778 B2 | 5/2016 | Koizumi et al. |
| 9,388,283 B2 | 7/2016 | Chiong et al. |
| 9,403,948 B2 | 8/2016 | Chiong et al. |
| 2003/0150804 A1* | 8/2003 | Haubs .................. B01D 12/00 210/634 |
| 2004/0164443 A1 | 8/2004 | Koyama |
| 2005/0171332 A1 | 8/2005 | Koyama |
| 2010/0163499 A1 | 7/2010 | Odueyungbo |
| 2011/0319587 A1 | 12/2011 | Hinokimori |
| 2013/0068256 A1 | 3/2013 | Kobayashi et al. |
| 2013/0317159 A1 | 11/2013 | Geibel et al. |
| 2015/0065664 A1 | 3/2015 | Konno et al. |
| 2015/0087776 A1 | 3/2015 | Chiong et al. |
| 2015/0087777 A1 | 3/2015 | Chiong et al. |
| 2015/0087778 A1 | 3/2015 | Chiong et al. |
| 2015/0087805 A1 | 3/2015 | Nekkanti et al. |
| 2015/0175748 A1 | 6/2015 | Fodor et al. |

FOREIGN PATENT DOCUMENTS

| | | |
|---|---|---|
| JP | S5847026 | 3/1983 |
| JP | S58125721 | 7/1983 |
| JP | S59168032 | 9/1984 |
| JP | S6055029 | 3/1985 |
| JP | S60235838 | 11/1985 |
| JP | S61228023 | 10/1986 |
| JP | S62285922 | 12/1987 |
| JP | H0280432 | 3/1990 |
| JP | H02160834 | 6/1990 |
| JP | H02302436 | 12/1990 |
| JP | H05271414 | 10/1993 |
| JP | H06145355 | 5/1994 |
| JP | H0649762 | 6/1994 |
| JP | H07118389 | 5/1995 |
| JP | H07228699 | 8/1995 |
| JP | H07242746 | 9/1995 |
| JP | H07292107 | 11/1995 |
| JP | H07330911 | 12/1995 |
| JP | H0841201 | 2/1996 |
| JP | H08100064 | 4/1996 |
| JP | H08134216 | 5/1996 |
| JP | H08151443 | 6/1996 |
| JP | H08157600 | 6/1996 |
| JP | H08157718 | 6/1996 |
| JP | H08170016 | 7/1996 |
| JP | H08170017 | 7/1996 |
| JP | H08176302 | 7/1996 |
| JP | H08193130 | 7/1996 |
| JP | H08193131 | 7/1996 |
| JP | H08198965 | 8/1996 |
| JP | H08198966 | 8/1996 |
| JP | H08198967 | 8/1996 |
| JP | H08231722 | 9/1996 |
| JP | H08231723 | 9/1996 |
| JP | H08239474 | 9/1996 |
| JP | 2543673 | 10/1996 |
| JP | H08253587 | 10/1996 |
| JP | H08269199 | 10/1996 |
| JP | H08269200 | 10/1996 |
| JP | H08283413 | 10/1996 |
| JP | H08319348 | 12/1996 |
| JP | H09104816 | 4/1997 |
| JP | H09124940 | 5/1997 |
| JP | H09194726 | 7/1997 |
| JP | H09296042 | 11/1997 |
| JP | H107798 | 1/1998 |
| JP | H1045911 | 2/1998 |
| JP | H1045912 | 2/1998 |
| JP | H1060113 | 3/1998 |
| JP | H10110034 | 4/1998 |
| JP | H10158399 | 6/1998 |
| JP | H10195197 | 7/1998 |
| JP | H10245434 | 9/1998 |
| JP | H1180355 | 3/1999 |
| JP | H11169870 | 6/1999 |
| JP | H11349566 | 12/1999 |
| JP | 2000136246 | 5/2000 |
| JP | 2000191785 | 7/2000 |
| JP | 2000239383 | 9/2000 |
| JP | 2001040090 | 2/2001 |
| JP | 2001172387 | 6/2001 |
| JP | 2001181394 | 7/2001 |
| JP | 2002187949 | 7/2002 |
| JP | 2002201274 | 7/2002 |
| JP | 2002201275 | 7/2002 |
| JP | 2002212292 | 7/2002 |
| JP | 2003026803 | 1/2003 |
| JP | 2003275773 | 9/2003 |
| JP | 2004107567 | 4/2004 |
| JP | 2004182753 | 7/2004 |
| JP | 2004352923 | 12/2004 |
| JP | 2005041922 | 2/2005 |
| JP | 2005047953 | 2/2005 |
| JP | 2005264030 | 9/2005 |
| JP | 2005344045 | 12/2005 |
| JP | 2006016567 | 1/2006 |
| JP | 2007077209 | 3/2007 |
| JP | 2007314803 | 12/2007 |
| JP | 2008075055 | 4/2008 |
| JP | 2008239767 | 10/2008 |
| JP | 2008248153 | 10/2008 |
| JP | 2008248154 | 10/2008 |
| JP | 4256506 | 4/2009 |
| JP | 2009185143 | 8/2009 |
| JP | 2010037518 | 2/2010 |
| JP | 2010126621 | 6/2010 |
| JP | 4994997 | 8/2012 |
| JP | 2013023586 | 2/2013 |

OTHER PUBLICATIONS

International Search Report and Written Opinion for PCT/US16/17079, dated May 16, 2016, 8 pages.

Related U.S. Patent Applications Form.

Fahey et al., Poly(p-phenylene sulfide) Synthesis: A Step-Growth Polymerization with Unequal Step Reactivity, *Macromolecules* 1997, pp. 387-393, 7 pages.

Hendrich A. Chiong, U.S. Appl. No. 15/045,301, filed Feb. 17, 2016, Method for Forming a High Molecular Weight Polyarylene Sulfide.

Hendrich A. Chiong, U.S. Appl. No. 15/045,313, filed Feb. 17, 2016, Method of Polyarylene Sulfide Precipitation.

Hendrich A. Chiong, U.S. Appl. No. 15/045,301, filed Feb. 17, 2016, Technique for Forming a High Melt Viscosity Polyarylene Sulfide.

* cited by examiner

METHOD FOR FORMING A LOW VISCOSITY POLYARYLENE SULFIDE

RELATED APPLICATIONS

The present application claims priority to U.S. Provisional Application Ser. No. 62/117,988, filed on Feb. 19, 2015; 62/197,634, filed on Jul. 28, 2015; and 62/206,124 filed on Aug. 17, 2015, which are incorporated herein in their entirety by reference thereto.

BACKGROUND OF THE INVENTION

Polyarylene sulfides are high-performance polymers that may withstand high thermal, chemical, and mechanical stresses and are beneficially utilized in a wide variety of applications. Polyarylene sulfides are generally formed via polymerization of a dihaloaromatic monomer with an alkali metal sulfide or an alkali metal hydrosulfide in an organic amide solvent. Following formation, the polyarylene sulfide is washed to separate the polymer from the solvent, unreacted monomers, and other impurities. Many conventional washing solutions rely on the use of acetyl compounds (i.e., acetone) to quickly remove the reaction solvent and a substantial portion of partially polymerized oligomers from the polyarylene sulfide. Unfortunately, polyarylene sulfides that are washed with such acetyl solutions tend to contain residual amounts of malodorous compounds, which are generally undesirable. Furthermore, many alternative organic solvents are problematic in that they tend to solubilize the oligomers to such a large extent that the melt viscosity of the polymer substantially increases. As such, a need currently exists for an improved washing technique that does not have a significant adverse impact on the melt viscosity of the resulting polyarylene sulfide.

SUMMARY OF THE INVENTION

In accordance with one embodiment of the present invention, a method for forming a polyarylene sulfide is disclosed. The method comprises contacting a slurry of a polyarylene sulfide with a washing solution, wherein the washing solution contains from about 30 wt. % to about 70 wt. % of water and from about 30 wt. % to about 70 wt. % of an aprotic organic solvent. The polyarylene sulfide has an oligomer content of from about 0.5 wt. % to about 2 wt. % and a melt viscosity of about 2,350 poise or less, as determined in accordance with ISO Test No. 11443:2005 at a shear rate of 1200 s$^{-1}$ and at a temperature of 310° C.

In accordance with another embodiment of the present invention, a system for washing a polyarylene sulfide is disclosed that comprises a slurry of a polyphenylene sulfide, a washing solution that contains from about 40 wt. % to about 60 wt. % of water and from about 40 wt. % to about 60 wt. % of N-methylpyrrolidone, and a sedimentation column that is configured to receive the slurry of the polyarylene sulfide and the washing solution.

BRIEF DESCRIPTION OF THE FIGURES

The present disclosure may be better understood with reference to the following figures.

DETAILED DESCRIPTION

Figure 1:
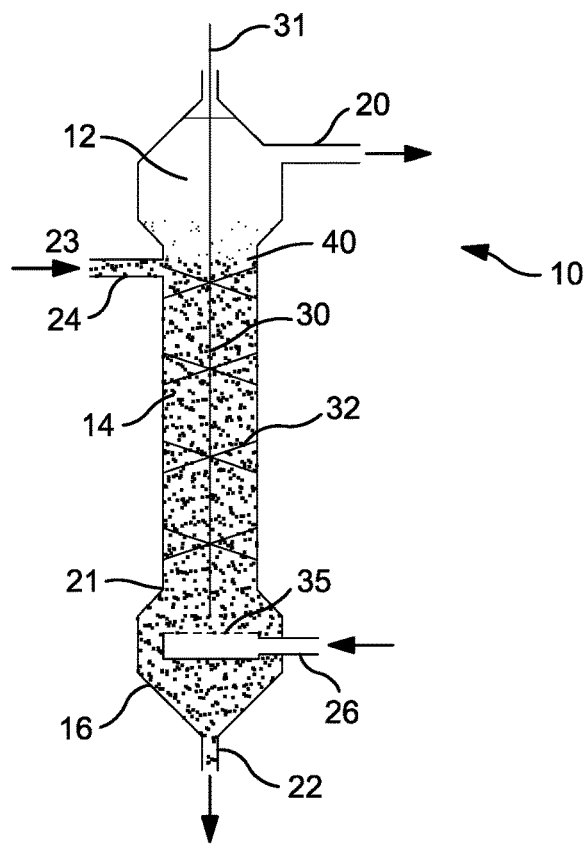
FIG. 1 illustrates one embodiment of a sedimentation column that may be employed in the present invention.

It is to be understood by one of ordinary skill in the art that the present discussion is a description of exemplary embodiments only, and is not intended as limiting the broader aspects of the present invention.

Generally speaking, the present invention is directed to a method for washing a polyarylene sulfide with a washing solution that contains a carefully controlled solvent content. More particularly, the washing solution typically contains water (e.g., deionized water) in an amount of from about 30 wt. % to about 70 wt. %, in some embodiments from about 35 wt. % to about 65 wt. %, and in some embodiments, from about 40 wt. % to about 60 wt. %. The washing solution also contains an aprotic organic solvent in an amount of from about 30 wt. % to about 70 wt. %, in some embodiments from about 35 wt. % to about 65 wt. %, and in some embodiments, from about 40 wt. % to about 60 wt. %. Within such carefully controlled ranges, the present inventors have discovered that the polyarylene sulfide can retain a relatively high oligomer content, which in turn, helps minimize the melt viscosity. The oligomer content may, for instance, range from about 0.5 wt. % to about 2 wt. %, in some embodiments from about 0.8 wt. % to about 1.8 wt. %, and in some embodiments, from about 1.2 wt. % to about 1.6 wt. %. The polyarylene sulfide may likewise have a melt viscosity of about 2,350 poise or less, in some embodiments about 2,300 poise or less, and in some embodiments, from about 1,000 to about 2,280 poise, as determined in accordance with ISO Test No. 11443:2005 at a shear rate of 1200 s$^{-1}$ and at a temperature of 310° C. In addition, the crystallization temperature of the polyarylene sulfide may also remain relatively low, such as about 200° C. or less, in some embodiments about 195° C. or less, and in some embodiments, from about 140° C. to about 190° C.

The weight average molecular weight of the polyarylene sulfide may also be from about 30,000 to about 60,000 Daltons, in some embodiments about 35,000 Daltons to about 55,000 Daltons, and in some embodiments, from about 40,000 to about 50,000 Daltons. While having a low molecular weight, the present inventors have surprisingly discovered that the polydispersity index (weight average molecular weight divided by the number average molecular weight) is also relatively low, thus resulting in a polymer that is more readily formed into particles with a narrow particle size distribution. For instance, the polydispersity index of the polyarylene sulfide may be about 4.3 or less, in some embodiments about 4.1 or less, and in some embodiments, from about 2.0 to about 4.0. The number average molecular weight of the polyarylene sulfide may, for instance, be from about 8,000 about 12,500 Daltons, in some embodiments about 9,000 Daltons to about 12,500 Daltons, and in some embodiments, from about 10,000 to about 12,000 Daltons.

Various embodiments of the present invention will now be described in more detail below.

I. Polyarylene Sulfide

The polyarylene sulfide generally has repeating units of the formula:

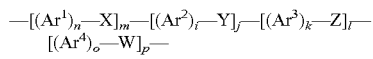

wherein, $Ar^1$, $Ar^2$, $Ar^3$, and $Ar^4$ are independently arylene units of 6 to 18 carbon atoms; W, X, Y, and Z are independently bivalent linking groups selected from —$SO_2$—, —S—, —SO—, —CO—, —O—, —C(O)O— or alkylene or alkylidene groups of 1 to 6 carbon atoms, wherein at least one of the linking groups is —S—; and n, m, i, j, k, l, o, and p are independently 0, 1, 2, 3, or 4, subject to the proviso that their sum total is not less than 2.

The arylene units $Ar^1$, $Ar^2$, $Ar^3$, and $Ar^4$ may be selectively substituted or unsubstituted. Advantageous arylene units are phenylene, biphenylene, naphthylene, anthracene and phenanthrene. The polyarylene sulfide typically includes more than about 30 mol %, more than about 50 mol %, or more than about 70 mol % arylene sulfide (—S—) units. For example, the polyarylene sulfide may include at least 85 mol % sulfide linkages attached directly to two aromatic rings. In one particular embodiment, the polyarylene sulfide is a polyphenylene sulfide, defined herein as containing the phenylene sulfide structure —$(C_6H_4-S)_n$— (wherein n is an integer of 1 or more) as a component thereof.

The polyarylene sulfide may be a homopolymer or copolymer. For instance, selective combination of dihaloaromatic compounds may result in a polyarylene sulfide copolymer containing not less than two different units. For instance, when p-dichlorobenzene is used in combination with m-dichlorobenzene or 4,4'-dichlorodiphenylsulfone, a polyarylene sulfide copolymer may be formed containing segments having the structure of formula:

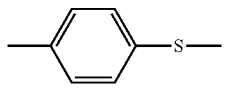

and segments having the structure of formula:

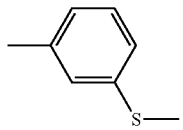

or segments having the structure of formula:

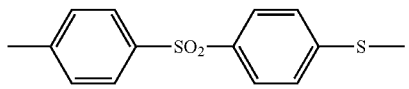

The polyarylene sulfide(s) may be linear, semi-linear, branched or crosslinked. Linear polyarylene sulfides typically contain 80 mol % or more of the repeating unit —(Ar—S)—. Such linear polymers may also include a small amount of a branching unit or a cross-linking unit, but the amount of branching or cross-linking units is typically less than about 1 mol % of the total monomer units of the polyarylene sulfide. A linear polyarylene sulfide polymer may be a random copolymer or a block copolymer containing the above-mentioned repeating unit. Semi-linear polyarylene sulfides may likewise have a cross-linking structure or a branched structure introduced into the polymer a small amount of one or more monomers having three or more reactive functional groups.

Various techniques may generally be employed to synthesize the polyarylene sulfide. By way of example, a process for producing a polyarylene sulfide may include reacting a material that provides a hydrosulfide ion (e.g., an alkali metal sulfide) with a dihaloaromatic compound in an organic amide solvent. The alkali metal sulfide may be, for example, lithium sulfide, sodium sulfide, potassium sulfide, rubidium sulfide, cesium sulfide or a mixture thereof. When the alkali metal sulfide is a hydrate or an aqueous mixture, the alkali metal sulfide may be processed according to a dehydrating operation in advance of the polymerization reaction. An alkali metal sulfide may also be generated in situ. In addition, a small amount of an alkali metal hydroxide may be included in the reaction to remove or react impurities (e.g., to change such impurities to harmless materials) such as an alkali metal polysulfide or an alkali metal thiosulfate, which may be present in a very small amount with the alkali metal sulfide.

The dihaloaromatic compound may be, without limitation, an o-dihalobenzene, m-dihalobenzene, p-dihalobenzene, dihalotoluene, dihalonaphthalene, methoxy-dihalobenzene, dihalobiphenyl, dihalobenzoic acid, dihalodiphenyl ether, dihalodiphenyl sulfone, dihalodiphenyl sulfoxide or dihalodiphenyl ketone. Dihaloaromatic compounds may be used either singly or in any combination thereof. Specific exemplary dihaloaromatic compounds may include, without limitation, p-dichlorobenzene; m-dichlorobenzene; o-dichlorobenzene; 2,5-dichlorotoluene; 1,4-dibromobenzene; 1,4-dichloronaphthalene; 1-methoxy-2,5-dichlorobenzene; 4,4'-dichlorobiphenyl; 3,5-dichlorobenzoic acid; 4,4'-dichlorodiphenyl ether; 4,4'-dichlorodiphenylsulfone; 4,4'-dichlorodiphenylsulfoxide; and 4,4'-dichlorodiphenyl ketone. The halogen atom may be fluorine, chlorine, bromine or iodine, and two halogen atoms in the same dihalo-aromatic compound may be the same or different from each other. In one embodiment, o-dichlorobenzene, m-dichlorobenzene, p-dichlorobenzene or a mixture of two or more compounds thereof is used as the dihalo-aromatic compound. As is known in the art, it is also possible to use a monohalo compound (not necessarily an aromatic compound) in combination with the dihaloaromatic compound in order to form end groups of the polyarylene sulfide or to regulate the polymerization reaction and/or the molecular weight of the polyarylene sulfide.

Although by no means required, the polyarylene sulfide can, in certain embodiments be formed in a multi-stage process that includes at least two separate formation stages. One stage of the formation process may include reaction of a complex that includes a hydrolysis product of an organic amide solvent and alkali metal hydrogen sulfide with a dihaloaromatic monomer to form a prepolymer. Another stage of the process may include further polymerization of the prepolymer to form the final product. Optionally, the process may include yet another stage in which the organic amide solvent and an alkali metal sulfide are reacted to form the complex. If desired, the different stages may take place in different reactors. The utilization of separate reactors for each of the stages may decrease cycle time, as the total cycle time may be equal to that of the slowest stage, rather than the sum of all stages as in a single reactor system. In addition, the utilization of separate reactors may decrease capital costs, as smaller reactors may be utilized than would be necessary for the same size batch in a single reactor system. Moreover, as each reactor need only meet the specifications of the stage being carried out in that reactor, a single, large reactor that meets the most stringent parameters of all stages of the formation process is no longer necessary, which may further decrease capital costs.

In one embodiment, for instance, a multi-stage process may be employed that utilizes at least two separate reactors. The first reactor may be utilized for a first stage of the process during which an organic amide solvent and an alkali metal sulfide react to form a complex that includes a hydrolysis product of the organic amide solvent (e.g., an alkali metal organic amine carboxylic acid salt) and an alkali metal hydrosulfide. Exemplary organic amide solvents as may be used in a forming the polyarylene sulfide may include, without limitation, N-methyl-2-pyrrolidone; N-ethyl-2-pyrrolidone; N,N-dimethylformamide; N,N-dimethylacetamide; N-methylcaprolactam; tetramethylurea; dimethylimidazolidinone; hexamethyl phosphoric acid triamide and mixtures thereof. The alkali metal sulfide may be, for example, lithium sulfide, sodium sulfide, potassium sulfide, rubidium sulfide, cesium sulfide or a mixture thereof. An alkali metal sulfide may also be generated in situ. For instance, a sodium sulfide hydrate may be prepared within the first reactor from sodium hydrogen sulfide and sodium hydroxide that may be fed to the reactor. When a combination of alkali metal hydrogen sulfide and alkali metal hydroxide are fed to the reactor to form the alkali metal sulfide, the molar ratio of alkali metal hydroxide to alkali metal hydrogen sulfide may be between about 0.80 and about 1.50. In addition, a small amount of an alkali metal hydroxide may be included in the first reactor to remove or react impurities (e.g., to change such impurities to harmless materials) such as an alkali metal polysulfide or an alkali metal thiosulfate, which may be present in a very small amount with the alkali metal sulfide.

The feed to the first reactor may include sodium sulfide (Na$_2$S) (which may be in the hydrate form), N-methyl-2-pyrrolidone (NMP) and water. Reaction between the water, sodium sulfide and the NMP may form a complex including sodium methylaminobutyrate (SMAB—a hydrolysis product of NMP) and sodium hydrogen sulfide (NaSH) (SMAB—NaSH) according to the following reaction scheme:

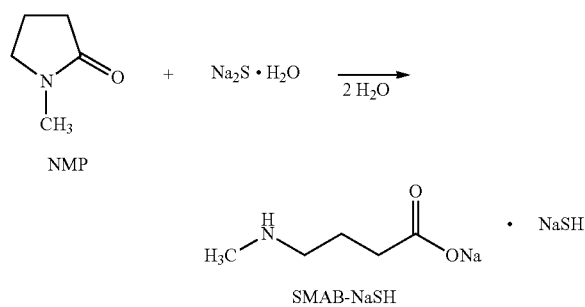

According to one embodiment, a stoichiometric excess of the alkali metal sulfide may be utilized in the first stage reactor, though this is not a requirement of the formation stage. For instance, the molar ratio of organic amide solvent to sulfur in the feed may be from 2 to about 10, or from about 3 to about 5, and the molar ratio of water to the sulfur source in the feed may be from about 0.5 to about 4, or from about 1.5 to about 3.

During the formation of the complex, the pressure within the first reactor may be held at or near atmospheric pressure. To maintain the low pressure reaction conditions, vapor may be removed from the reactor. The main constituents of the vapor may include water and hydrogen sulfide by-product. Hydrogen sulfide of the vapor can, for instance, be separated at a condenser. A portion of the water that is separated at such a condenser may be returned to the reactor to maintain the reaction conditions. Another portion of the water may be removed from the process so as to dehydrate the SMAB—NaSH solution formed in the first stage. For instance, the molar ratio of water to NaSH (or the ratio of oxygen to sulfur) in the product solution of the first reactor may less than about 1.5, or may be between about 0.1 and about 1 such that the SMAB—NaSH complex solution that is fed to the second stage reactor is near-anhydrous.

Once formed, the SMAB—NaSH complex may then be fed to a second reactor in conjunction with a dihaloaromatic monomer (e.g., p-dichlorobenzene) and a suitable solvent so as to form the polyarylene sulfide prepolymer in the second stage of the process. The amount of the dihaloaromatic monomer(s) per mole of the effective amount of the charged alkali metal sulfide may generally be from about 1.0 to about 2.0 moles, in some embodiments from about 1.05 to about 2.0 moles, and in some embodiments, from about 1.1 to about 1.7 moles. If desired, the dihaloaromatic monomer may be charged into the second reactor with a relatively low molar ratio of the dihaloaromatic monomer to the alkali metal hydrogen sulfide of the complex. For instance, the ratio of the dihaloaromatic monomer to sulfur charged to the second reactor may be from about 0.8 to about 1.5, and in some embodiments, from about 1.0 to about 1.2. The relatively low ratio of the dihaloaromatic monomer to the alkali metal hydrogen sulfide of the complex may be favorable for the formation of the final high molecular weight polymer via the condensation polymerization reaction. The ratio of solvent to sulfur in the second stage may also be relatively low. For instance, the ratio of the alkali metal hydrogen sulfide of the complex to the organic amide solvent in the second stage (including the solvent added to the second reactor and solvent remaining in the complex solution from the first reactor) may be from about 2 to about 2.5. This relatively low ratio may increase the concentration of reactants in the second reactor, which may increase the relative polymerization rate and the per volume polymer production rate.

The second reactor may include a vapor outlet for removal of vapor during the second stage in order to maintain the desired pressure level. For instance, the second reactor may include a pressure relief valve as is known in the art. Vapor removed from the second stage may be condensed and separated to recover unreacted monomer for return to the reactor. A portion of the water of the vapor may be removed to maintain the near-anhydrous conditions of the second stage, and a portion of the water may be returned to the second reactor. A small amount of water in the second reactor may generate reflux in the top of the reactor, which may improve separation between the water phase and the organic solvent phase in the reactor. This may in turn minimize loss of the organic solvent in the vapor phase removed from the reactor as well as minimize loss of hydrogen sulfide in the vapor stream due to absorption of the hydrogen sulfide by the highly alkaline organic solvent as discussed previously.

The second stage polymerization reaction may generally be carried out at a temperature of from about 200° C. to about 280° C., or from about 235° C. to about 260° C. The duration of the second stage may be, e.g., from about 0.5 to about 15 hours, or from about 1 to about 5 hours. Following the second stage polymerization reaction, the mean molar mass of the prepolymer as expressed by the weight average molecular weight, $M_w$, may be from about 500 g/mol to about 30,000 g/mol, from about 1000 g/mol to about 20,000 g/mol, or from about 2000 g/mol to about 15,000 g/mol.

Following the second stage polymerization reaction, the product solution that exits second stage reactor may include the prepolymer, the solvent, and one or more salts that are formed as a by-product of the polymerization reaction. For example, the proportion by volume of the prepolymer solution exiting the second stage reactor of salt that is formed as a byproduct to the reaction may be from about 0.05 to about 0.25, or from about 0.1 to about 0.2. Salts included in the reaction mixture may include those formed as a byproduct during the reaction as well as other salts added to the reaction mixture, for instance as a reaction promoter. The salts may be organic or inorganic, i.e., may consist of any combination of organic or inorganic cations with organic or inorganic anions. They may be at least partially insoluble in the reaction medium and have a density different from that of the liquid reaction mixture. According to one embodiment, at least a portion of the salts in the prepolymer mixture that exits the second stage reactor may be removed from the mixture. For instance, the salts may be removed by use of screens or sieves as has been utilized in traditional separation processes. A salt/liquid extraction process may alternatively or additionally be utilized in separating the salt from the prepolymer solution. In one embodiment, a hot filtration process may be utilized in which the solution may be filtered at a temperature at which the prepolymer is in solution and the salts are in the solid phase. According to one embodiment, a salt separation process may remove about 95% or more of the salts including in the prepolymer solution that exits the second reactor. For instance greater than about 99% of the salts may be removed from the prepolymer solution.

Following the prepolymer polymerization reaction in the second stage of the process and the filtration process, an optional third stage of the formation may take place during which the molecular weight of the prepolymer is increased in a third reactor. Input to the third reactor may include the prepolymer solution from the second reactor in addition to solvent, one or more dihaloaromatic monomers, and a sulfur-containing monomer. For instance, the amount of the sulfur-containing monomer added in third stage may be about 10% or less of the total amount required to form the product polyarylene sulfide. In the illustrated embodiment, the sulfur-containing monomer is sodium sulfide, but this is not a requirement of the third stage, and other sulfur containing monomers, such as an alkali metal hydrogen sulfide monomer may alternatively be utilized.

The third reaction conditions may be nearly anhydrous, with the ratio of water to the sulfur-containing monomer less than about 0.2, for instance between 0 and about 0.2. The low water content during the third stage of the process may increase the polymerization rate and the polymer yield as well as reduce formation of undesired side reaction by-products as the conditions are favorable for nucleophilic aromatic substitution, as discussed above. Moreover, as pressure increases in the third stage are generally due to water vaporization, low water content during this stage may allow the third reaction to be carried out at a constant, relatively low pressure, for instance less than about 1500 kPa. As such, the third reactor 104 need not be a high pressure reactor, which may provide substantial cost savings to a formation process as well as decrease safety risks inherent to high pressure reactors.

The reaction conditions within the third reactor may also include a relatively low molar ratio for the solvent to the sulfur-containing monomer. For instance, the ratio of solvent to sulfur-containing monomer may be from about 2 to about 4, or from about 2.5 to about 3. The reaction mixture of the third stage may be heated to a temperature of from about 120° C. to about 280° C., or from about 200° C. to about 260° C. and the polymerization may continue until the melt viscosity of the thus formed polymer is raised to the desired final level. The duration of the second polymerization step may be, e.g., from about 0.5 to about 20 hours, or from about 1 to about 10 hours. The weight average molecular weight of the formed polyarylene sulfide may vary as is known, but in one embodiment may be from about 1000 g/mol to about 500,000 g/mol, from about 2,000 g/mol to about 300,000 g/mol, or from about 3,000 g/mol to about 100,000 g/mol.

Following the third stage, and any desired post-formation processing, the polyarylene sulfide may be discharged from the third reactor, typically through an extrusion orifice fitted with a die of desired configuration, cooled, and collected. Commonly, the polyarylene sulfide may be discharged through a perforated die to form strands that are taken up in a water bath, pelletized and dried. The polyarylene sulfide may also be in the form of a strand, granule, or powder.

II. Washing Technique

Regardless of the particular manner in which the polyarylene sulfide is formed, it is contacted with a washing solution containing carefully controlled amounts of water and an aprotic organic solvent, as noted above. Particularly suitable aprotic organic solvents include, for instance, halogen-containing solvents (e.g., methylene chloride, 1-chlorobutane, chlorobenzene, 1,1-dichloroethane, 1,2-dichloroethane, chloroform, and 1,1,2,2-tetrachloroethane); ether solvents (e.g., diethyl ether, tetrahydrofuran, and 1,4-dioxane); ketone solvents (e.g., acetone and cyclohexanone); ester solvents (e.g., ethyl acetate); lactone solvents (e.g., butyrolactone); carbonate solvents (e.g., ethylene carbonate and propylene carbonate); amine solvents (e.g., triethylamine and pyridine); nitrile solvents (e.g., acetonitrile and succinonitrile); amide solvents (e.g., N,N'-dimethylformamide, N,N'-dimethylacetamide, tetramethylurea and N-methylpyrrolidone); nitro-containing solvents (e.g., nitromethane and nitrobenzene); sulfide solvents (e.g., dimethylsulfoxide and sulfolane); and so forth. Regardless of the particular solvents employed, the entire solvent system (e.g., water and N-methylpyrrolidone) typically constitutes from about 80 wt. % to 100 wt. %, in some embodiments from about 85 wt. % to 100 wt. %, and in some embodiments, from about 90 wt. % to 100 wt. % of the washing solution.

Of course, various other suitable materials may also be used in the washing solution, such as stabilizers, surfactants, pH modifiers, etc. For example, basic pH modifiers may be employed to help raise the pH of the washing solution to the desired level, which is typically above 7, in some embodiments from about 8.0 to about 13.5, in some embodiments from about 9.0 to about 13.5, and in some embodiments, from about 11.0 to about 13.0. Suitable basic pH modifiers may include, for instance, ammonia, alkali metal hydroxides (e.g., sodium hydroxide, lithium hydroxide, potassium hydroxide, etc.), alkaline earth metal hydroxides, etc., as well as combinations thereof. Nevertheless, one beneficial aspect of the present invention is that good properties may be provided without the need for various types of conventional additives. For example, the washing solution may be generally free of acetyl compounds (e.g., acetone and/or acetic acid), which are conventionally required to achieve a polyarylene sulfide having a high degree of purity. The washing solution may thus contain acetyl compounds (e.g., acetone and/or acetic acid) in an amount of no more than about 0.1 wt. %, in some embodiments no more than about 0.05 wt. %, and in some embodiments, and in some embodiments, no more than about 0.01 wt. % of the washing solution. Of course, in certain embodiments, higher amounts of acetone may be employed in the washing solution if so desired.

The temperature of the washing solution can also be controlled to help facilitate the washing process. For instance, the temperature of the solution may be from about 10° C. to about 150° C., in some embodiments from about 15° C. to about 120° C., in some embodiments from about 20° C. to about 100° C., and in some embodiments, from about 15° C. to about 40° C. In certain cases, heating may be conducted at a temperature that is above the atmospheric pressure boiling point of a solvent in the mixture. In such embodiments, the heating is typically conducted under a relatively high pressure, such as above 1 atm, in some embodiments above about 2 atm, and in some embodiments, from about 3 to about 10 atm.

Figure 2:
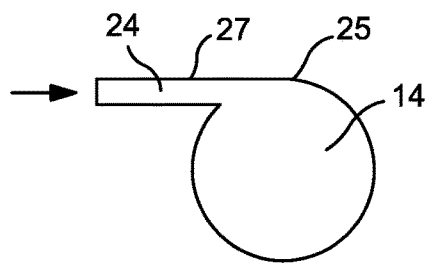
FIG. 2 illustrates a cross-sectional top view of the middle section of the sedimentation column of FIG. 1 at the slurry inlet.
Figure 3:
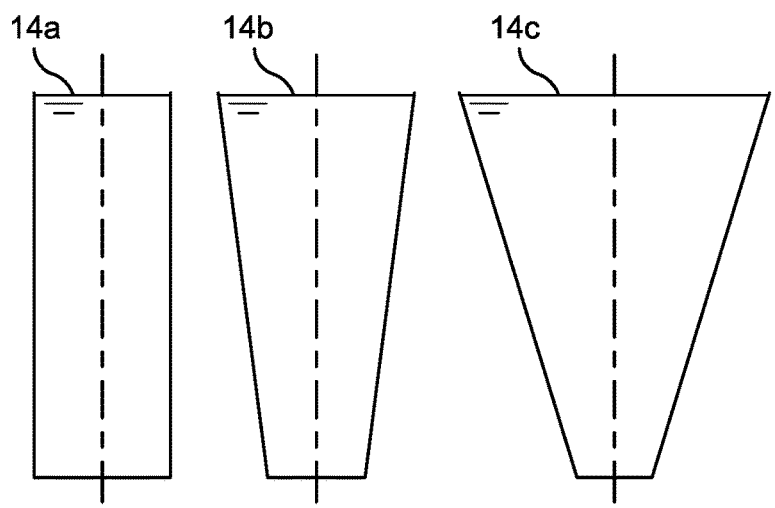
FIG. 3 illustrates several different embodiments of longitudinal cross-sectional shapes of a middle section of a sedimentation column that may be employed in the present invention.

The manner in which the polyarylene sulfide is contacted with the washing solution may vary as desired. In one embodiment, for instance, a system may be employed in which the polyarylene sulfide is contacted with the washing solution within a vessel, such as a bath, sedimentation column, etc. Referring to FIGS. 1-3, for instance, one embodiment of a sedimentation column 10 is shown that is configured to receive a polyarylene sulfide and washing solution. The sedimentation column 10 may include an upper section 12 that includes liquid outlet 20, a middle section 14 that includes inlet 24, and a lower section 16 that includes a solids outlet 22 and a liquid inlet 26. Though illustrated with a vertical arrangement, it should be understood that the sedimentation column may be utilized at other than a vertical arrangement, and the sedimentation column may be at an angle to vertical as long as solids flow through the sedimentation column from the inlet 24 to the outlet 22 may be by gravitational force.

The upper section 12 and the lower section 16 may have cross sectional areas that are larger than that of the middle section 14. In one embodiment, the sections of the sedimentation column 10 may be circular in cross section, in which case the upper section 12 and lower section 16 may have cross sectional diameters that are larger than the cross sectional diameter of the middle section 14. For instance, the upper section 12 and the lower section 16 may have diameters that are from about 1.4 to about 3 times greater than the diameter of the middle section. For instance, the upper and lower sections may independently have diameters that are about 1.4, about 2, or about 2.5 times greater than the diameter of the middle section 14. The larger cross sectional area of the upper section 12 may prevent overflow of solids at the outlet 20 and the larger cross sectional area of the lower section 16 may prevent solids flow restriction at the outlet 22. It should be understood that the sedimentation column 10 is not limited to any particular geometric shape and the cross section of the sedimentation column is not limited to circular. Moreover, the cross sectional shape of each section of the sedimentation column may vary with regard to one another. For example, one or two of the upper section 12, the middle section 14, and the lower section 16 may have an oval-shaped cross section, while the other section(s) may be round in cross section.

The middle section 14 of the sedimentation column 10 may include an inlet 24 through which a polymer slurry may be fed to the sedimentation column 10. The slurry may include the polyarylene sulfide in conjunction with other byproducts from the formation process, such as reaction solvents (e.g., N-methylpyrrolidone), salt byproducts, unreacted monomers or oligomers, etc. As shown in FIG. 2, the inlet 24 meets a wall 25 of the middle section 14 substantially tangent to the wall 25. The term "substantially tangent" as utilized herein may be determined by the distance between the true tangent of the wall 25 of the middle section 14 and the outer wall 27 of the inlet 24. When the inlet 24 meets the wall 25 of the middle section at a perfect tangent, this distance will be 0. In general, this distance will be less than about 5 centimeters, for instance less than about 3 centimeters. Placement of the inlet 24 such that the inlet 24 is substantially tangent to the outer wall 25 of the middle section 14 may prevent disruption of the fluid flow pattern within the sedimentation column 10. This may improve contact and mass transfer between the downward flowing solids and the upward flowing liquid and may also prevent loss of solids through the outlet 20 of the upper section 12. To further ensure that solids are not lost through the outlet 20, the inlet 24 may be placed in the middle section 14 at a distance from the junction 23 where the middle section 14 meets the upper section 12. For instance, the vertical distance between the midpoint of the inlet 24 and the junction 23 may be equal to or greater than about 5% of the total height of the middle section 14. For instance, the vertical distance between the midpoint of the inlet 24 and the junction 23 may be from about 5% to about 50% of the total height of the middle section 14. The total height of the middle section 14 is that distance between the junction 23, where the upper section 12 meets the middle section 14 and the junction 21, where the middle section 14 meets the lower section 16.

The line at inlet 24 may carry the slurry from a polymerization reaction apparatus to the middle section 14 of the sedimentation column 10. The middle section 14 of the sedimentation column may include an agitator 30 that incorporates an axial shaft 31 and a series of stirring blades 32 along the axial length of the middle section 14. The agitator 30 may minimize channeling of liquid within the sediment (fluidized bed) and may maintain contact between the slurry contents and the upwardly flowing solvent as well as maintain flow of the solids through the sedimentation column 10. The stirring blades 32 may extend from the axial shaft 31 toward the wall 25 of the middle section 14. In general, the stirring blades may extend at least half of the distance from the axial shaft to the wall 25 and, in one embodiment, may extend almost all of the way to the wall 25. In one embodiment, the sedimentation column may be free of sedimentation plates or trays as have been utilized in previously known sedimentation columns.

As shown, the axial shaft 31 may support a series of stirring blades 32 along the length of the middle section 14. In general, at least two stirring blades 32 may extend from the axial shaft 31 in a balanced arrangement at each point of blade extension. This is not a requirement, however, and three, four, or more stirring blades may extend from the axial shaft 31 at a single location along the shaft 31 or alternatively, a single blade may extend from a single location on the shaft 31 and the stirring blades may be offset from one another as they pass down the length of the shaft 31 so as to maintain balance of the agitator 30 during use. The axial shaft 31 may have stirring blades 32 extending therefrom at a plurality of locations along the shaft 31. For instance, the axial shaft may have stirring blades extending therefrom at from about 3 to about 50 locations along axial shaft 31, with two or more stirring blades 32 extending from the axial shaft at each location. In one embodiment, the distribution of the blades along the axial shaft 31 may be such that there are more blades in the fluidized bed section at the bottom as compared to the number of blades in the upper portion of section 14. During operation, the axial shaft 31 may rotate at a speed that is typically from about 0.1 rpm to about 1000 rpm, for instance from about 0.5 rpm to about 200 rpm or from about 1 rpm to about 50 rpm.

In the illustrated embodiment, a countercurrent flow is employed in which the polymer slurry flow is in a direction opposite to that of the flow of the washing solution. Referring again to FIG. 1, for instance, the polymer slurry is fed to the middle section 14 of the sedimentation column 10 via the inlet 24. The washing solution is, on the other hand, fed to the lower section 16 of the column 10 via an inlet 26. In this manner, the washing solution can flow upwardly through the column as it contacts the polymer slurry as it flows downwardly through the column towards the solids outlet 22. If desired, the inlet 26 may include a distributor 35 that may enhance fluid flow through the solids and prevent solids from entering the inlet 26. The lower section 16 may also have a conical shape to concentrate the solids content at the outlet 22. The solids content of the slurry at the outlet 22 may generally be about 20 wt. % or greater, or about 22 wt. % or greater in some embodiments. If desired, the washing solution may be heated prior to being fed to the inlet 26, such as described above. In such embodiments, the sedimentation column may include heating elements to maintain an elevated temperature during the washing process.

If desired, a fluidized bed may also be formed in the sedimentation column with increasing concentration of solids from the top of the bed to the solids outlet 22. The fluidized bed height may be monitored and controlled so as to better control the residence time of solids in the sedimentation column. Through improved control of residence time for the sedimentation column, the efficiency of the separation process carried out within the sedimentation column may be improved, which may translate to lower operational costs and improved separations. In addition, control of the fluidized bed height and residence time may help to prevent solids loss through the liquid outlet 20 of the upper section 12. A sensor may be used to monitor the fluidized bed height within the sedimentation column 10. The sensor type is not limited and may be any suitable sensor that may monitor the fluidized bed height including both internal sensors and external sensors. For example, sensors may utilize, without limitation, optical, infrared, radio frequency, displacement, radar, bubble, vibrational, acoustic, thermal, pressure, nuclear and/or magnetic detection mechanisms to determine the fluidized bed height within the sedimentation column 10. By way of example, in one embodiment, an optical sensor 40 (e.g., a laser-based sensor including a laser source and a detector) may be located within the middle section 14 of the sedimentation column 10, for instance near the level of the inlet 24, which may detect reflection of the laser to determine relative density differences of the materials within the sedimentation column 10 and thus convey information concerning the location of the top of the fluidized bed to a control system. The control system may relay that information to a valve that may control flow of solids out of the sedimentation column at outlet 22 and/or a valve that may control flow of solids into the sedimentation column at inlet 24 so as to control the bed height. Surge tanks may also be included in the lines leading to and from the sedimentation column as is known to maintain control of the fluidized bed height. Other systems as are known in the art for controlling the height of a fluidized bed may alternatively be utilized, and the method and system utilized to control the bed height is not particularly limited. The top of the fluidized bed may be at or near the inlet 24. To improve control of the residence time of the solids in the sedimentation column 10, the sediment bed height variation during the process may vary less than about 10% of the total height of the middle section 14. For instance, the fluidized bed height variation during a process may be less than about 5% of the total height of the middle section 14.

Though illustrated in FIG. 1 as a cylindrical column, the longitudinal cross-sectional shape of the middle section 14 is not limited to this embodiment. For example, and as illustrated in FIG. 3, middle sections 14*a*, 14*b*, and 14*c* of sedimentation columns may be straight or tapered with increasing angles from a cylindrical middle section as illustrated at 14*a* to increasing angles as shown at 14*b* and 14*c*. When tapered, the middle section may be wider at the top than at the bottom so as to increase solids concentration at the bottom of the sedimentation column without impeding transport of solids. That is, if the angle of taper is too large, solids flow may be impeded at the wall of the middle section. A preferred taper angle will vary for each system depending upon flow rates, physical properties of the compounds to be carried within the system such as particle size and shape, as well as depending on column materials and surface roughness.

In certain embodiments, the polyarylene sulfide can be contacted with the washing solution of the present invention in a single step. For example, a single sedimentation column can be employed within which the polyarylene sulfide is washed. In alternative embodiments, however, multiple washing steps may be employed. The washing solutions employed in the stages of such a process need not be the same, and the washing solution of the present invention can be employed in one stage or in multiple stages. In one embodiment, for instance, multiple sedimentation columns may be used in series, one or more of which have a countercurrent flow such as described above.

Figure 4:
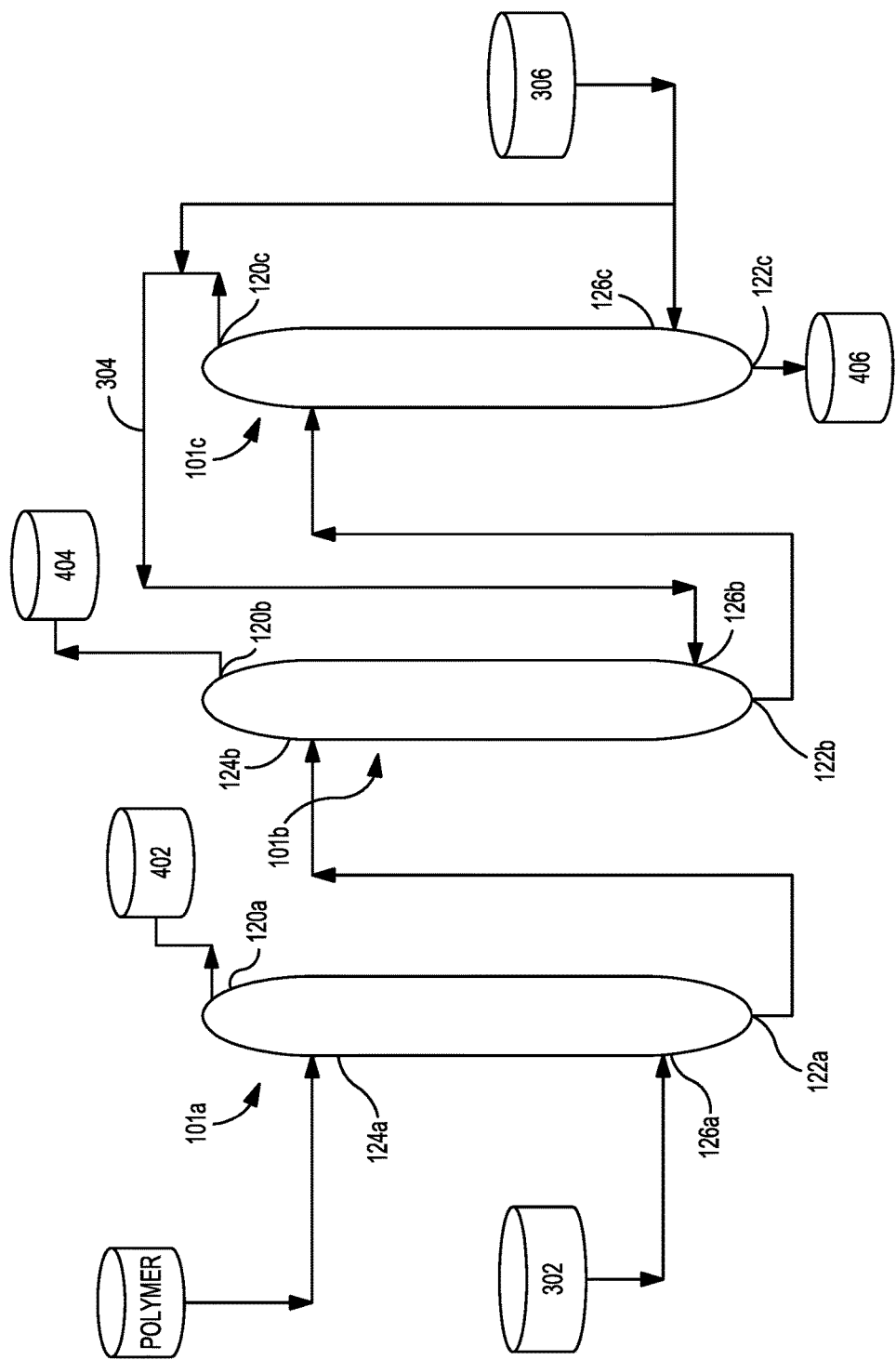
FIG. 4 illustrates one embodiment of a washing system that may be employed in the present invention.

Referring to FIG. 4, for instance, one embodiment of a washing process is shown that employs three sedimentation columns 101*a*, 101*b*, and 101*c* in series. While the system may include one or more sedimentation columns having the design as described above, this is not a requirement of the disclosed systems. For instance, the system may include sedimentation columns that vary somewhat in design from the sedimentation column described above, e.g., the sedimentation columns of the system of FIG. 4 do not include upper and lower sections having a larger cross sectional area as compared to the middle section. In any case, the system may include multiple sedimentation columns 101*a*, 101*b*, and 101*c* in series.

To initiate flow through the first sedimentation column 101*a*, it may be initially supplied with a polymer slurry via inlet 124*a*. A first washing solution 302 may likewise be supplied to the column 101 via inlet 126*a*. The first washing solution 302 will generally flow upwardly through the column in a direction counter to that of the polymer slurry until reaching an outlet 120*a*, where a first wash product 402 is removed which may include the solution and dissolved compounds of the polymer slurry feed. As shown, a solids outlet 122*a* may thereafter feed solids from the first sedimentation column 101*a* to a slurry inlet 124*b* of the second sedimentation column 101*b*. A second washing solution 304 will generally flow upwardly through the column 101*b* via an inlet 126*b* in a direction counter to that of the solids until reaching an outlet 120*b*, where a second wash product 404 is removed. Although not required, the second washing solution 304 can be a recycle stream that is removed from the third sedimentation column 101c via an outlet 120c. In the final sedimentation column 101c, the solids from the second sedimentation column may be fed via inlet 124c. A third washing solution 306 will generally flow upwardly through the column 101c via an inlet 126c in a direction counter to that of the solids, which exits the column via an outlet 122c to form the polymer product 406.

As noted above, the washing solutions employed in each stage of the washing process may vary, if desired. For instance, the first washing solution 302 may be formed from water and an aprotic organic solvent (e.g., N-methylpyrrolidone) in accordance with the present invention. The second washing solution 304 and/or the third washing solution 306 may be formed from a similar solution or from a solution that contains only water or only an organic solvent (e.g., N-methylpyrrolidone). Regardless, once washed the resulting polyarylene sulfide may be dried according to any technique known in the art. Drying may occur at a temperature of from about 80° C. to about 250° C., in some embodiments from about 100° C. to about 200° C., and in some embodiments, from about 120° C. to about 180° C. The purity of the resulting polyarylene sulfide may be relatively high, such as about 95% or more, or about 98% or more.

Test Methods

Molecular Weight:

A sample of PPS may be initially converted to PPSO by oxidation with a mixture of cold $HNO_3$ (50%) in a trifluoroacetic acid mixture. The resulting PPSO may be dissolved in warm hexafluoroisopropanol (HFIP) for 1 hour and then analyzed for molecular weight by GPC equipped with PSS-hexafluoroisopropanol (HFIP) gel columns. The gel columns may be fitted with an HFIP-gel guard column using HFIP as mobile phase and refractive index (RI) as detector.

Melt Viscosity:

The melt viscosity may be determined as scanning shear rate viscosity and determined in accordance with ISO Test No. 11443:2005 (technically equivalent to ASTM D3835-08) at a shear rate of 1200 $s^{-1}$ and at a temperature of about 310° C. using a Dynisco 7001 capillary rheometer. The rheometer orifice (die) may have a diameter of 1 mm, a length of 20 mm, an L/D ratio of 20.1, and an entrance angle of 180°. The diameter of the barrel may be 9.55 mm+0.005 mm and the length of the rod was 233.4 mm. Prior to measurement, samples are dried in a vacuum oven for 1.5 hours at 150° C.

Crystallization Temperature:

The crystallization temperature may be determined by differential scanning calorimetry ("DSC") as is known in the art. Under the DSC procedure, samples are heated during a first heating cycle at a rate of 50° C. per minute to a temperature of 340° C., cooled at a rate of 10° C. per minute to a temperature of 50° C., and then heated during a second heating cycle at a rate of 50° C. per minute to a temperature of 340° C., and cooled again at a rate of 10° C. per minute to a temperature of 50° C. using DSC measurements conducted on a TA Q2000 Instrument. The temperature at the highest point of the exothermic curve obtained during the second heating cycle is generally referred to herein as the "crystallization temperature."

Oligomer Content:

The oligomer content of a sample may be determined by contacting the sample with an extraction solution that contains 100 wt. % chloroform at a temperature of 60° C. and pressure of 1,500 psi. The sample is rinsed twice with the extraction solution, and thereafter the extracted solvent is dried and the weight of the extractables is measured. The oligomer content is determined by dividing the weight of the extractables by the weight of the original sample, and then multiplying by 100.

pH:

The resin pH is measured in a mixed solvent of water/acetone (volume ratio=2/1). Liquid pH is measured by initially filtering solids from the washing liquid, and thereafter measuring pH with a standard pH meter.

EXAMPLE

Eleven (11) samples of a PPS slurry are initially filtered to remove the liquid portion. The resulting PPS flakes are manually charged into a reactor vessel and then stirred with the appropriate solvent wash for a set time. The process includes the use of two (2) or three (3) initial washes with an organic solvent (e.g., acetone, NMP, or a NMP:water mixture), followed by five (5), seven (7), or eleven (11) washes with 100% water. For Samples 10-11, the pH in the last water wash step is adjusted to at least 12.0 by the addition of 5% NaOH solution to the water. The total washing time is 20 minutes, and the drain time is 12 minutes for the organic solvent wash steps and 6 minutes for the water wash steps. Once drained, the bottom drain and filter are removed and the solids are collected in a pan and dried under vacuum of about 15 psig for 16 hours at a temperature of 105° C. A small purge of air is maintained in the oven to minimize condensation of NMP on the walls. The washing conditions are summarized below.

| Sample | Organic Solvent | Wt. Ratio of Solvent/PPS | # of Organic Washes | # of Water Washes | Wash Temp, ° C. | pH of the Last Washing Liquid |
|---|---|---|---|---|---|---|
| 1 | 100% Acetone | 5.5 | 2 | 5 | 20 | — |
| 2 | 100% Acetone | 3.5 | 2 | 5 | 20 | — |
| 3 | 100% NMP | 3.5 | 2 | 5 | 20 | — |
| 4 | 50% NMP: 50% H2O | 5.5 | 2 | 5 | 20 | — |
| 5 | 75% NMP: 25% H2O | 3.5 | 2 | 5 | 20 | 9.64 |
| 6 | 75% NMP: 25% H2O | 3.5 | 2 | 5 | 20 | 9.64 |
| 7 | 75% NMP: 25% H2O | 3.5 | 2 | 7 | 20 | 9.28 |
| 8 | 75% NMP: 25% H2O | 3.5 | 2 | 7 | 20 | 9.28 |
| 9 | 75% NMP: 25% H2O | 5.5 | 3 | 11 | 74 | 8.23 |
| 10 | 75% NMP: 25% H2O | 3.5 | 2 | 7 | 24 | 12.02 |
| 11 | 75% NMP: 25% H2O | 5.5 | 3 | 11 | 74 | 12.17 |

The resulting polymer samples are then tested as described above. The results are set forth below.

| Sample | Melt Viscosity at 1200 s$^{-1}$ | Crystallization Temperature, °C. | Resin pH | % Oligomers |
|---|---|---|---|---|
| 1 | 2,254 | 190.4 | 9.9 | 1.21 |
| 2 | 2,285 | 193.8 | 10.0 | 1.28 |
| 3 | 2,314 | 193.2 | 10.2 | 0.58 |
| 4 | 2,032 | 202.7 | 10.0 | 1.48 |
| 5 | 1,990 | 193.4 | 10.1 | 1.43 |
| 6 | 2,094 | 191.7 | 10.1 | 1.43 |
| 7 | 1,936 | 192.3 | 10.1 | 1.41 |
| 8 | 2,004 | 198.0 | 9.9 | 1.59 |
| 9 | 1,715 | 224.3 | 7.4 | 1.38 |
| 10 | 2,128 | 210.7 | 11.0 | 1.46 |
| 11 | 2,532 | 192.8 | 11.3 | 1.34 |

While particular embodiments of the present disclosure have been illustrated and described, it would be obvious to those skilled in the art that various other changes and modifications may be made without departing from the spirit and scope of the disclosure. It is therefore intended to cover in the appended claims all such changes and modifications that are within the scope of this disclosure.

What is claimed is:

1. A method for forming a washed polyarylene sulfide, the method comprising contacting a slurry of a polyarylene sulfide with a washing solution within a vessel in which the slurry of the polyarylene sulfide enters the vessel at a slurry inlet that is located such that solids of the slurry flow via a gravity flow from the slurry inlet to a solids outlet and in which the washing solution enters the vessel at a liquid inlet and flows counter current to the gravity flow of the solids to a liquid outlet that is above the slurry inlet, wherein the washing solution contains from about 30 wt. % to about 70 wt % of water and from about 30 wt. % to about 70 wt. % of an aprotic organic solvent, wherein the washed polyarylene sulfide has an oligomer content of from about 0.5 wt. % to about 2 wt. % and a melt viscosity of about 2,350 poise or less, as determined in accordance with ISO Test No. 11443:2005 at a shear rate of 1200 s$^{-1}$ and at a temperature of 310° C.

2. The method of claim 1, wherein the aprotic organic solvent is N-methylpyrrolidone.

3. The method of claim 1, wherein the washing solution has a pH level of from about 8.0 to about 13.5.

4. The method of claim 1, wherein the washing solution is generally free of acetone.

5. The method of claim 1, wherein the washing solution is at a temperature of from about 15° C. to about 120° C.

6. The method of claim 1, wherein the slurry of the polyarylene sulfide is contacted with the washing solution within a sedimentation column.

7. The method of claim 1, wherein the washed polyarylene sulfide has an oligomer content of from about 1.2 wt. % to about 1.6 wt. %.

8. The method of claim 1, wherein the washed polyarylene sulfide has a melt viscosity of from about 1,000 to about 2,280 poise, as determined in accordance with ISO Test No. 11443:2005 at a shear rate of 1200 s$^{-1}$ and at a temperature of 310° C.

9. The method of claim 1, wherein the washed polyarylene sulfide has a crystallization temperature of about 200° C. or less.

10. The method of claim 1, wherein the washed polyarylene sulfide has a polydispersity index of about 4.3 or less.

11. The method of claim 10, wherein the washed polyarylene sulfide has a weight average molecular weight of from about 30,000 to about 60,000 Daltons.

12. The method of claim 10 wherein the washed polyarylene sulfide has a number average molecular weight of from about 8,000 about 12,500 Daltons.

13. The method of claim 1, wherein the washed polyarylene sulfide is a linear polyphenylene sulfide.

14. The method of claim 1, further comprising contacting the washed polyarylene sulfide with an additional washing solution.

15. The method of claim 14, wherein the additional washing solution contains water.

16. The method of claim 1, further comprising drying the washed polyarylene sulfide after contact with the washing solution.

17. The method of claim 14, wherein the washed polyarylene sulfide is further contacted with the additional washing solution in a second vessel in which the washed polyarylene sulfide flows via gravity flow counter current to the additional washing solution.

18. The method of claim 17, wherein the additional washing solution is fed to the second vessel from a third vessel, the washed polyarylene sulfide being further contacted with the additional washing solution in the third vessel.

* * * * *